Patented Aug. 13, 1929.

1,724,695

UNITED STATES PATENT OFFICE.

GLENN DAVIDSON, OF SEATTLE, WASHINGTON, ASSIGNOR TO I. F. LAUCKS INC., OF SEATTLE, WASHINGTON, A CORPORATION OF WASHINGTON.

PROCESS OF PREPARING SUBSTANCES COMPOSED IN PART OF PROTEIN-CONTAINING CELLS FOR THE MANUFACTURE OF ADHESIVES.

No Drawing. Application filed June 27, 1927. Serial No. 201,975.

My invention relates to the process of preparing substances composed in part of protein containing cells for the manufacture of adhesives.

In the use of proteins of animal origin, such as casein, blood albumen, egg albumen, hide glue, fish glue, etc. as materials for adhesives, their efficiency depends greatly upon the readiness with which the proteins are dispersed in water, alkaline solutions or solutions containing other chemicals. This dispersion is relatively simple in the case of these proteins of animal origin in common usage as raw materials for adhesives because they have no structure other than molecular and atomic, being amorphous and are not associated with insoluble and non-adhesive matter such as cell wall material.

However, when vegetable protein containing materials such as oil seed residues are considered as the raw materials for use in the manufacture of adhesives, it is found that the dispersion of the vegetable protein is very difficult because of the fact that it is contained within cells having walls of cellulose like material.

In addition the seeds are originally enclosed within one or more seed coats composed of cellulose or cellulose like material and this seed coat matter appears in the oil seed residues as ruptured or torn fibrous matter difficult or impossible of dispersion or solution in water, acids, alkalies or other reagents commonly or commercially used in preparation of proteins for adhesive use.

By "oilseed residues" I mean the commercial "cake" or "meal" left after the removal of the oil, in whole or in part, from oil seeds by pressing or extracting, as, for instance, such articles of commerce as soya bean cake or meal, peanut cake or meal, cottonseed cake or meal, linseed cake or meal, etc.

The cellulose or cellulose-like material composing the cell walls and seed coat not only acts as a diluent for the vegetable protein but renders the dispersion of the vegetable protein more difficult and more expensive.

The objection to the cellulose-like material as a diluent might perhaps be somewhat reduced by screening on a coarse screen such as an 80 mesh screen, having openings of 0.177 millimeters, which screen might remove some of the coarsest flattened particles of seed coat. Also increasing the total amount of vegetable protein containing material used in an adhesive formula to supply a given percentage of vegetable protein would, to some extent, overcome the difficulty of the diluent but at increased cost and would not decrease the disadvantage of the difficult dispersion of the vegetable protein because of the enclosing cell walls.

The non-cellulose-like material may be dispersed in a varying degree by water, solutions of alkalies, by acids and by other reagents. These reagents have only slight dissolving effect on the integument of the protein containing cells and on the seed coat material or they cause this cellulose or cellulose-like material to swell to marked extent or in some cases no effect at all is noted. It will readily be understood that when material to be acted upon, dispersed or dissolved, by reagents is encased in material exceptionally resistant to such reagents and is at the same time accompanied by or attached to comparatively large fragments of such resistant material (as, for example, particles of seed coat in this instance), the cost of the operation in time and quantity and concentration of reagent will be greatly increased because of the retarding action of the encasing and diluent material. Further, reagents which will, to some extent, attack the cell wall material will have very little, if any, effect upon the seed coat material beyond, in some instanaces, causing it to swell and become still further a deterrent to the efficient action of the reagent upon the vegetable protein.

A further effect of such encasing and diluent material in the wet adhesive is to prevent fluidity, stringiness and lustre, all of which are desirable and often necessary properties of a commercial adhesive.

I have discovered that the amount of water required to bring an adhesive mixture to a given viscosity if the flour substantially passes a 200 mesh screen is lower than that required for an adhesive formed from a flour whose particle size is such that it contains unbroken cells. It is often of the utmost importance to reduce the water requirement to a minimum in a commercial adhesive. Therefore, my discovery of the effect of breaking the cell wall upon the viscosity of an adhesive affords one way of reducing the amount of water. By "breaking the cell walls", I mean that the integument of the aleurone grains, that is, the protein grains constituting together with the oil particles, the contents of the individual palisade cells, is broken or ruptured so that the dispersing reagents have ready access through a relatively large opening to the protein grains, said openings resulting from mechanical subdivision of the individual cells. The openings thus produced result from an actual breaking of the integument and are not small openings of a character which may result when the oil content is caused to squeeze out. The term "broken wall" as herein used refers to an opening that results from a tearing or cutting of the integument, so that the protein grains are exposed to the direct action of the dispersing reagents. Thus this breaking the integument of the individual cell is to be distinguished from merely crushing the cell structure of the seed. Mere crushing the cell structure falls far short of breaking the cell walls, although the cell structure, collectively, and even the cells individually, may be deformed so that the cell structure proper, i. e. order or arrangement, is completely altered.

For example, strong nitric acid as shown by my experimentation, attacks cell wall material, but after five hours the cell wall material is not completely dissolved, and after 16 hours contact of oil seed residues with strong nitric acid particles of seed coat were still undissolved. Strong nitric acid is not commonly used as a dispersing agent for proteins in the manufacture of adhesives but is a common reagent for digestion of cellulose. Thus, is illustrated the difficulty of making readily available the protein grains to the action of the dispersing reagents.

Further, caustic soda disperses the protein efficiently when the cell walls are sufficiently softened by contact with caustic soda for a period prolonged beyond economical usage, to be ruptured by swelling of protein and cell wall material and thus permit the caustic soda to come fully in contact with the protein. Seed coat material will remain intact, however, under this treatment, although, it becomes greatly swollen, i. e., the cell walls are very difficult if not practically impossible to disintegrate by this swelling method.

In previous use of vegetable protein containing material such as oil seed residues, it has been considered that grinding to 80 mesh (0.177 millimeters) would result in a product which was suitable for use in manufacture of adhesives. I have discovered that this is not the case and that grinding to 80 mesh only was highly inefficient and resulted in the production of adhesives, which, while in many respects better than adhesives produced from other proteins, were not as strong nor as water resistant as those adhesives which could be made with the same vegetable protein containing material, such as oil seed residues ground to pass 200 mesh (0.074 millimeters).

For example, I give below a formula used in making a typical adhesive using as a vegetable protein containing material, flour from soya bean cake (an oil seed residue). In the one case the flour was ground to pass eighty mesh and in the second ground to pass 200 mesh, otherwise the formula and mixing of the adhesive were the same.

*Formula.*

| | Parts. |
|---|---|
| Soya bean flour | 300 |
| Powdered rosin | 16 |
| Calcium hydrate | 81 |
| Sodium carbonate | 23.5 |
| Sodium fluoride | 18.5 |
| Potassium permanganate | 1.5 |
| Sodium silicate | 130 |
| Water | 1,325 |

*Mixing directions.*—The dry ingredients, namely, soya bean flour, powdered rosin, calcium hydrate, sodium carbonate, sodium fluoride, and potassium permanganate, are thoroughly mixed together in the dry state; 950 parts of water are placed in a suitable mixing device, the mixed dry ingredients are added and the whole stirred for three minutes; 130 parts sodium silicate are added; the mixture is stirred for 20 minutes; 375 parts of water are then added and the mixing continued for three (3) minutes when the adhesive is ready for application to plywood, for example.

Tests made using the two adhesives on gum plywood in accordance with standard practice gave the following results:—

| | Adhesive using soya bean flour through 80 mesh screen | Adhesive using soya bean flour through 200 mesh screen |
|---|---|---|
| Tensile strength in lbs. per square inch of glued surface: | *Lbs.* | *Lbs.* |
| Test pieces dry | 202 | 260 |
| Test pieces soaked 48 hours in water | 60 | 90 |

In seeking the reason for this discovery of increased efficiency of the vegetable protein, I made microscopic examination of the cells and seed coat in vegetable protein containing materials (oil seed residues) as, for instance, soya bean. I found the thickness of the seed coat to be greater than 0.10 millimeters after soaking in water and approximately 0.08 millimeters when dry. Further, I found the protein containing cells to be approximately 0.08 millimeters in length. Examination of individual cells, seed coat, etc., in such other oil seed residues as peanut cake, linseed cake, cottonseed cake, indicate that reduction of the particle size to not greater than 200 mesh (0.074 millimeters) in any dimension will so break up the integuments of protein containing cells, and so shred or divide the seed coat that the dispersing medium, alkalies, acids or other reagents may freely attack the vegetable protein. Hence, I make use of the 200 mesh screen as a testing means in determining whether the cell walls are broken.

This division or reduction of the oil seed residues may be accomplished entirely by dry grinding methods or by combination of dry grinding and wet grinding. In the latter instance the dry grinding may, perhaps, be the more economically carried to a stage where the vegtable protein containing material will pass screens of 80 mesh to 100 mesh (0.177 millimeters to 0.149 millimeters), the material then to be mixed with water or other suspending or dispersing medium and ground or subdivided or further reduced as to size of particle in a device such as a colloid mill. Wet grinding is advantageous where it can be used, because, since the cells are swollen when wet, they are therefore that much the more easily broken up and disintegrated. Not all the vegetable proteins can be ground wet, because of their chemical or colloidal properties.

In commercial practice I am content with grinding so that substantially all of the cells are broken or disintegrated. For example, I have found that soya bean flour having cell dimensions as shown, is brought to this state when approximately 95% will pass a 200 mesh screen, that is, a screen having apertures of 0.074 millimeters.

I claim:

1. The method of increasing the dispersability of vegetable protein-containing material of cellular structure in aqueous alkaline media for the manufacture of adhesives, which consists of mechanical subdivision of such material, after the greater proportion of the natural oil of said material has been removed, to such an extent that ninety-five percent of the particles are smaller than a screen opening of 0.074 millimeters.

2. The method of increasing the dispersability of soya bean protein-containing material of cellular structure in aqueous alkaline media for the manufacture of adhesives, which consists of mechanical subdivision of such material, after the greater proportion of the natural oil of said material has been removed, to such an extent that ninety-five percent of the particles are smaller than a screen opening of 0.074 millimeters.

In witness whereof I hereunto subscribe my name this 21st day of June, A. D. 1927.

GLENN DAVIDSON.